United States Patent [19]

Brozio

[11] Patent Number: 5,433,394

[45] Date of Patent: Jul. 18, 1995

[54] HANDLE ASSEMBLY FOR A FISHING-ROD REEL

[75] Inventor: Gerard Brozio, Rahden, Germany

[73] Assignee: D.A.M. Deutsche Angelgerate Manufaktur Hellmuth Kuntze GMBH & Co. KG, Gunzenheusen, Germany

[21] Appl. No.: 81,844

[22] Filed: Jun. 25, 1993

[30] Foreign Application Priority Data

Jun. 25, 1992 [DE] Germany .................. 42 20 781.9
Jun. 25, 1992 [DE] Germany .................. 9208485 U

[51] Int. Cl.⁶ ............................................... A01K 89/00
[52] U.S. Cl. .................................... 242/283; 74/523; 74/545; 74/557; 403/57; D22/140
[58] Field of Search ............ 242/283, 284, 323, 84.8, 242/395; 74/523, 545, 546, 557; D22/140, 141; 403/57

[56] References Cited

U.S. PATENT DOCUMENTS

| | | | |
|---|---|---|---|
| 2,775,418 | 12/1956 | Cadman | 242/118.7 |
| 3,296,731 | 1/1967 | Wood | 242/240 |
| 4,080,079 | 3/1978 | Waara | 403/57 |
| 4,117,568 | 10/1978 | Bullock | 74/545 |
| 4,220,054 | 9/1980 | Kuhlman | 74/545 |
| 4,404,866 | 9/1983 | Koike et al. | 74/546 |
| 4,967,445 | 11/1990 | Miller et al. | 74/545 X |
| 5,150,853 | 9/1992 | Bernard et al. | 242/283 |
| 5,292,087 | 3/1994 | Sato | 242/283 X |

FOREIGN PATENT DOCUMENTS

| | | |
|---|---|---|
| 1245007 | 9/1960 | France . |
| 1300841 | 7/1962 | France . |
| 2474853 | 8/1981 | France . |
| 211618 | 7/1908 | Germany . |
| 1945137 | 11/1970 | Germany . |
| 2421879 | 11/1974 | Germany . |
| 33337 | 3/1955 | Luxembourg . |
| 352896 | 7/1931 | United Kingdom . |

Primary Examiner—Daniel P. Stodola
Assistant Examiner—Michael R. Mansen
Attorney, Agent, or Firm—Bacon & Thomas

[57] ABSTRACT

A handle assembly for a crank of a fishing-rod reel includes universally pivoting finger engaging members which function to prevent wrist sprains and fatigue and also assure uniform guidance of a lure.

20 Claims, 4 Drawing Sheets

HANDLE ASSEMBLY FOR A FISHING-ROD REEL

BACKGROUND OF THE INVENTION

1. Field of the Invention

The present invention pertains to a fishing-rod reel and, more specifically, a handle arrangement mounted to a fishing-reel crank.

2. Discussion of the Prior Art

Cranks are well known and have long been used on fishing reels. In general, such cranks consist of a crank arm connected on one side to a part of the fishing reel which must be cranked, and further a handle mounted on the arm for rotation about its own longitudinal axis. Known cranks incorporate variously shaped handles. Some known cranking handles, as exemplified in German Offenlegungsschrift 1,945,137; French patents 1,300,841 and 1,245,007; U.S. Pat. Nos. 2,775,418 and 3,296,731; and German patent 2,421,879, are made of wood or plastic and evince diverse shapes. These cranking handles are directly or indirectly supported by a support pin which, on one side, is rigidly joined to the crank arm. Such assemblies only permit rotation of the handles about their own longitudinal axes, while other motions are precluded.

In a conventional fishing reel, the support pin is located at the end of the crank arm and is enclosed by a cylinder. In casting reels, the support pin is located directly at the edge of the line reel and, as a general rule, is enclosed by a cylinder. The handles of these known types of fishing-rod reels are rigidly affixed to the crank or to the line reel. This construction presents the following ergonometric problem: When the crank is being rotated, the fingers, i.e. the index finger and the thumb, compress the handle. Motional balance must be supplied by the wrist, which may lead to stressing and spraining of the wrist. Further, the skin is torsionally stressed at the contact areas between the finger tips and the rest-surface of the handle. Heretobefore, this stress could only be compensated at the wrist. In addition, once the wrist has been stressed, a lure can no longer be guided uniformly.

SUMMARY OF THE INVENTION

The object of the present invention is to provide a handle for a fishing-rod reel that prevents the occurrence of wrist stresses and sprains, as well as the torsional stresses associate with know handle arrangements such that uniform guidance of a lure shall be possible over a substantial time interval.

This and other objects of the present invention are achieved by providing a handle arrangement comprising at least one rest-surface for the user's fingers wherein the rest-surface is universally, pivotably connected so as to be movable in all directions by a universal joint, such as a ball bearing arrangement, relative to the handle. Therefore, the user's wrist no longer needs to follow the motion of the handle but it is the rest or finger engaging surface of the handle that follows the wrist motion. By this arrangement, a lure can be guided uniformly and smoothly, a feature that shall be assuredly appreciated by the experienced fisherman. With the cranking motion taking place ergonometrically, the potential for wrist fatigue is minimized as compared to known, conventional cranking handle arrangements. In addition, torsional stress on the skin at the fingertip contact area with the support is avoided.

The above mentioned mobility of each finger engaging surface relative to the handle by the use of a universal joint further offers the advantage that the finger engaging surface can rotate about its center axis, whereby, when cranking occurs, this rotation about the center axis can be carried out in addition to any lateral pivoting motion.

Further objects, features and advantages of the present invention will become more readily apparent from the following detailed description of preferred embodiments of the invention when taken in conjunction with the drawings wherein like reference numerals refer to corresponding parts in the several views.

DETAILED DESCRIPTION OF THE PREFERRED EMBODIMENTS

Figure 1:
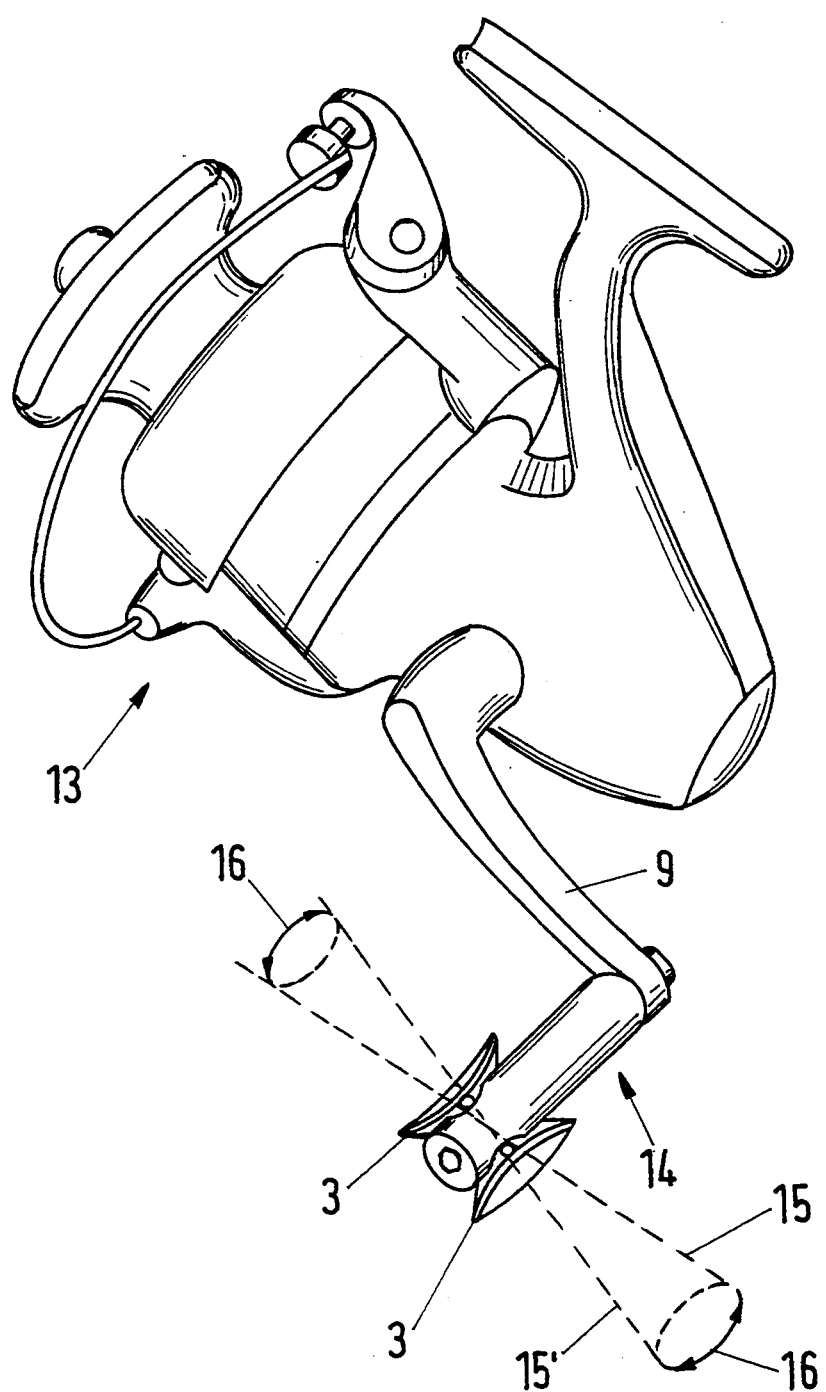
FIG. 1 is a perspective view of a fishing-rod reel incorporating a crank-arm and handle according to a first embodiment of the invention.

FIG. 1 shows a fishing-rod reel 13 having a handle assembly including a crank-arm 9 and a crank handle 14 made from diverse materials such as brass. Crank handle 14 further includes two finger engaging surface members 3. As indicated by the dashed lines 15, 15' and the circles 16, first engaging members 3 may be laterally shifted in each direction and may also rotate about their associated center axis C—C when the cranking handle assembly 9, 14 is being rotated as will be further discussed below.

Figure 2:
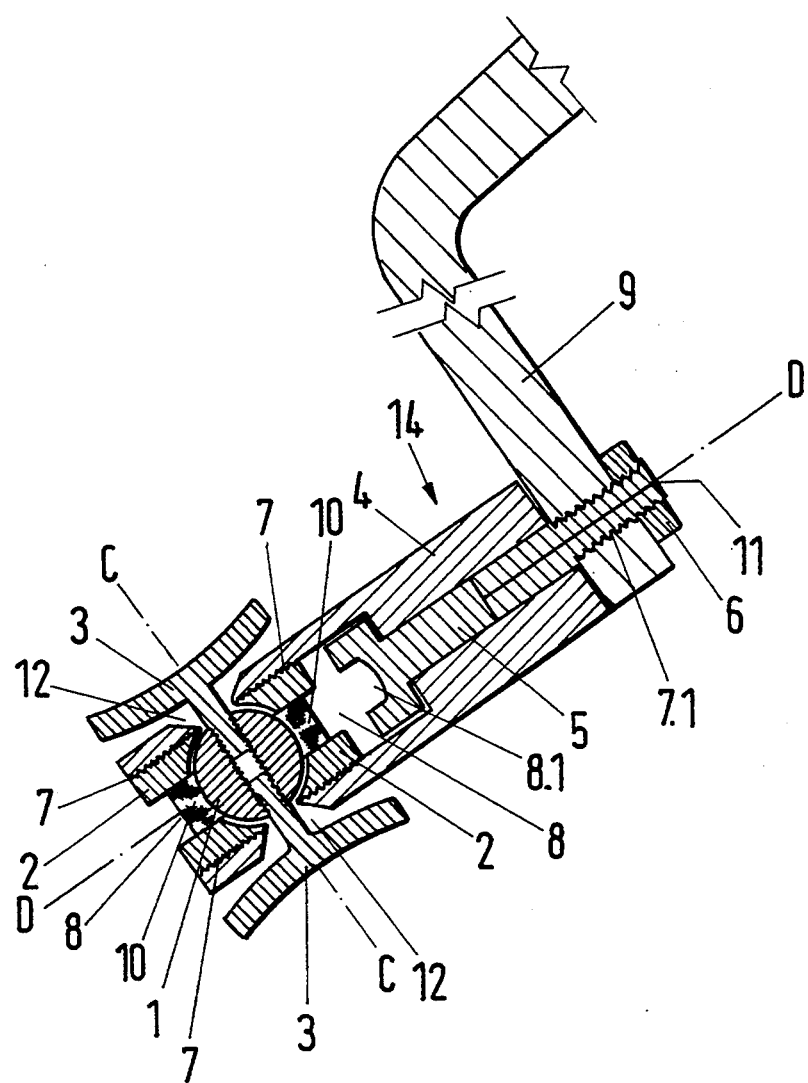
FIG. 2 is a longitudinal, cross-sectional view of the handle and part of the crank-arm of the first embodiment shown in FIG. 1.

FIG. 2 depicts a cross-sectional view of crank arm 9 and crank handle 14. The two finger engaging members 3 are fitted with threaded shanks 12 screwed into an internally threaded sphere 1. As depicted in the preferred embodiment shown, the internal threads extend entirely through sphere 1. Sphere 1 is mounted snugly into a ball bearing 2 formed in the handle 14. Sphere 1 is permitted to move in each direction inside ball bearing 2 which, in this instance, consists of two parts. Such motion incorporates not only the multi-directional pivotability denoted by reference numerals 15, 15' and 16 of FIG. 1, but also includes the above stated rotation of the finger engaging members 3 about their center axis C—C. In general, the mounting of sphere 1 in ball-bearing 2 enables universal pivoting of finger engaging members 3.

If fine positioning of sphere 1 is desirable or necessary, ball beating 2 may comprise socket bearing-elements 8 that are longitudinally displaceable by means of their connection with outer threads 7 in a cylinder 4 of the handle 14. As shown, cylinder 4 receives a bolt 5 therethrough which is affixed to crank arm 9. As discussed above and shown in FIG. 2, cylinder 4, on the one hand, forms the ball pivot-bearing for the finger engaging members 3 and on the other hand, by means of the bolt 5, a connector to the crank arm 9. As shown, a threaded connection is made with crank arm 9 and bolt 5 further receives a lock nut 6. Of course, this connection could take various other forms such as riveting handle 4 to crank arm 9. In any case, cylinder 4 is able to rotate about the longitudinal axis D—D which, in the embodiment depicted, is defined by bolt 5 and is prevented from moving transversely to the longitudinal direction D—D. If lubrication is desired, oil felts 10 may be incorporated at ball bearing 2 and, in addition, lubrication ducts 11 can be formed in the shank of bolt 5.

Figure 3:
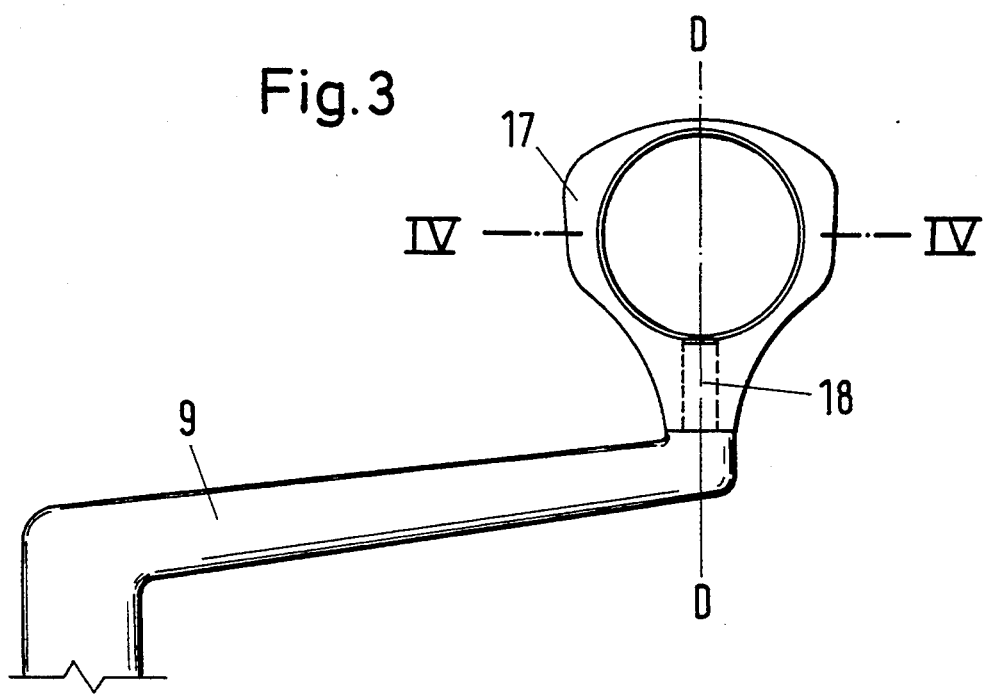
FIG. 3 is a top view of a second embodiment according to the invention.
Figure 4:
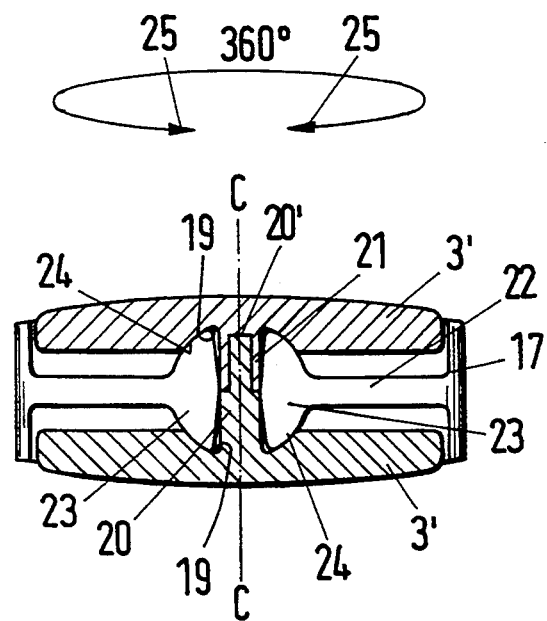
FIG. 4 is a cross-sectional view taken along line A–B of FIG. 3.
Figure 5:
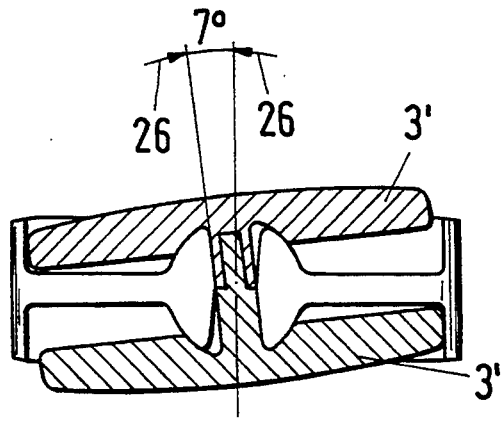
FIG. 5 is a cross-sectional view similar to that shown in FIG. 4 but with the finger engaging surfaces of the handle being shifted.

In the embodiment shown in FIGS. 3 through 5, the crank arm 9 is fitted with a toggle frame 17 which is pivotable about a toggle axis 18. Operationally, the toggle frame 17 corresponds to that of handle 14 of the FIGS. 1 and 2 embodiment. Accordingly, toggle frame 17 is rotatable about a corresponding longitudinal axis D—D defined by toggle axis 18.

As shown in the enlarged views of FIGS. 4 and 5, each finger engaging member 3' in this second embodiment comprises a spherical base or bed 19, all of which are joined together by means of two, interlocking fittings 20, 21 that pass through an aperture (not labeled) extending between heads 23 of toggle frame 17. More specifically, the fitting 20 includes a reduced diameter, pin-shaped extension 20' that is rigidly affixed, such as by bonding or clamping, inside a borehole (not labeled) formed in fitting 21.

Toggle frame 17 further includes a disk-shaped brace member 22 that terminates in heads 23. Heads 23 define spherical surfaces 24 which snugly slide in the spherical bases 19 of the finger engaging member 3'. In a manner directly analogous to finger engaging members 3 of the first embodiment, finger engaging members 3' may rotate in a circular path by 360° as shown by arrows 25 and may simultaneously pivot as indicated by arrows 26 in FIG. 5. Advantageously, the circular motion denoted by the arrows 25 in FIG. 4 and the motion denoted by the arrows 26 in FIG. 5 can be combined, i.e., motion in effect can occur about three orthogonal axes. As already discussed in relation to the embodiment of FIGS. 1, 2, the finger engaging members 3 and 3' thereby are able to universally (i.e., omni-directionally) pivot.

At this point, it should be recognized that the matching surfaces, namely the outer surface of the sphere 1 and the inner surface of the ball bearings 2 in the first embodiment and the spherical bases or beds 19 of the finger engaging elements 3' and the outer surfaces 24 of the heads 23 in the embodiment of FIGS. 3 through 5, represent only part of a spherical surface. Each of these constructions thereby provides for adequate lateral mobility as shown by lines 15, 15' in FIG. 1 and the arrows 26 in FIG. 6, with circular motion of 360° denoted by reference 16 in FIG. 1 and by reference 25 in FIG. 4. In other words, a complete revolution about the center axis C—C in both embodiments is provided. Accordingly, during cranking with two fingers compressing respective finger engaging members 3, 3', the finger engaging members 3, 3' will be able to rotate relative the handle 14 as well as being laterally pivotable relative thereto.

Figure 6:
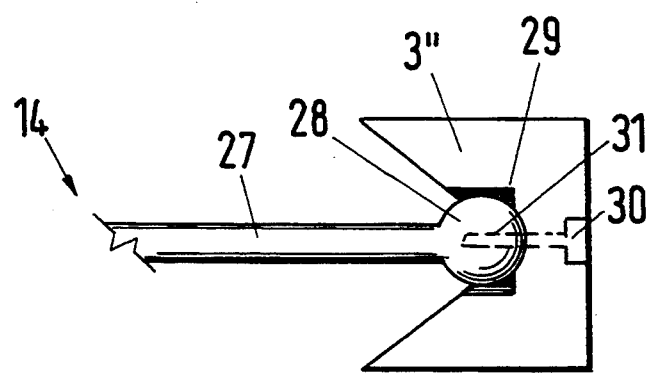
FIG. 6 is a schematic view of a third embodiment of the invention.

In special cases, for instance when high-sea fishing where extreme manual force must be exerted, it may be desirable to prevent the mobility of the finger engaging members relative to the crank. In this respect, FIG. 6 shows a handle 14 with a retaining arm 27 bearing a sphere 28. A single finger engaging member 3" is incorporated which provides multiple finger engaging surfaces. An insert 29 is affixed to finger engaging member 3" and defines an internal spherical surface which engages sphere 28. In this manner, finger engaging member 3" can universally pivot about sphere 28. If it is desired to prevent such motion, then a screw 30 can be inserted through finger engaging member 3" and screwed into an internal thread 31 of sphere 28.

Although described with respect to preferred embodiments of the invention, it should be readily apparent that various changes and/or modifications can be made without departing from the spirit of the invention. For instance, it should be readily recognized that various other types of universal joint arrangements could be utilized and other types of locking arrangements could be incorporated to perform the function of screw 30. In addition, it should be recognized that the handle arrangement of the present invention could be factory installed on a fishing rod or retrofitted on an existing fishing rod reel. In general, the invention is only intended to be limited by the scope of the following claims.

I claim:

1. A handle assembly for transmitting rotary manual motion comprising:
    a crank arm having first and second end portions;
    a manually engageable crank handle extending from the second end portion of said crank arm and rotatably connected thereto;
    at least one finger engaging member; and
    means for connecting said at least one finger engaging member to said crank handle, at a position spaced from the connection of said crank handle to said crank arm, for relative pivotal movement of said at least one finger engaging member relative to said crank handle about three orthogonal axes.

2. A handle assembly as claimed in claim 1, wherein said connecting means includes a sphere that is rigidly affixed to said at least one finger engaging member and a ball bearing carried by said crank handle, said sphere being retained within said ball bearing.

3. A handle assembly as claimed in claim 2, wherein two finger engaging members are provided, each of which is rigidly affixed to said sphere.

4. A handle assembly as claimed in claim 3, wherein said sphere is formed with a borehole within which said finger engaging members are secured.

5. A handle assembly as claimed in claim 1, wherein said connecting means comprises a spherical bed carried by said at least one finger engaging member and a spherical element rigidly connected to said crank handle.

6. A handle assembly as claimed in claim 5, wherein two interconnected finger engaging members are provided each of which carries a spherical bed with said spherical beds pointing toward each other and said spherical element fits between the spherical bases.

7. A handle assembly as claimed in claim 6, wherein said spherical element fits snugly between the spherical beds.

8. A handle assembly as claimed in claim 6, wherein each of said finger engaging members is formed with a connecting fitting and said spherical element includes a borehole, said connecting fittings passing through said borehole and being connected together for interconnecting said finger engaging members.

9. A handle assembly as claimed in claim 8, wherein said crank handle comprises a toggle frame which incorporates said spherical element.

10. A handle assembly as claimed in claim 1, wherein said crank handle is secured to the second end portion of said crank arm by a fastener element, said fastener element rotatably supporting a cylinder which is part of the crank handle and which supports said connecting means.

11. A handle assembly as claimed in claim 1, wherein said connecting means includes a bearing that defines a partial spherical surface.

12. A handle assembly as claimed in claim 1, wherein said connecting means includes a spherical bearing and means for adjusting the position of said spherical bearing.

13. A handle assembly as claimed in claim 1, further comprising locking means for selectively preventing relative motion between said at least one finger engaging member and said crank handle.

14. A handle assembly as claimed in claim 1, wherein said at least one finger engaging member is convexly contoured.

15. A fishing apparatus comprising:
   a fishing reel;
   a crank arm rotatably attached to said fishing reel;
   a crank handle rotatably attached to said crank arm and rotatable about a longitudinal axis relative to said crank arm;
   at least two finger engaging means being omni-directionally swivelable relative to the crank handle and rotatable about an axis, said axis being normal to a surface of said at least two finger engaging means and supported by a spherical bearing; and
   said at least two finger engaging means being separate from the crank handle.

16. A fishing apparatus as claimed in claim 15, including a ball shaped head rigidly affixed to the crank handle and each of said finger engaging means including a spherical bed forming said spherical bearing, said ball shaped head being retained in the spherical bed whereby said spherical bed is omni-directionally swivelable relative to the ball shaped head.

17. A fishing apparatus as claimed in claim 16, wherein two said at least two finger engaging means together with the spherical beds are aligned with each other and the ball-shaped head is located in between the two spherical beds.

18. A fishing apparatus as claimed in claim 16, wherein two said at least two finger engaging means are interconnected.

19. A fishing apparatus as claimed in claim 18, wherein each of the finger engaging means includes a firing and said two ball shaped head includes a borehole, whereby said fittings extend within borehole and connect said two finger engaging means together.

20. A fishing apparatus as claimed in claim 19, wherein said crank handle defines a toggle frame within which said ball shaped head is located.

* * * * *